Figure 1:
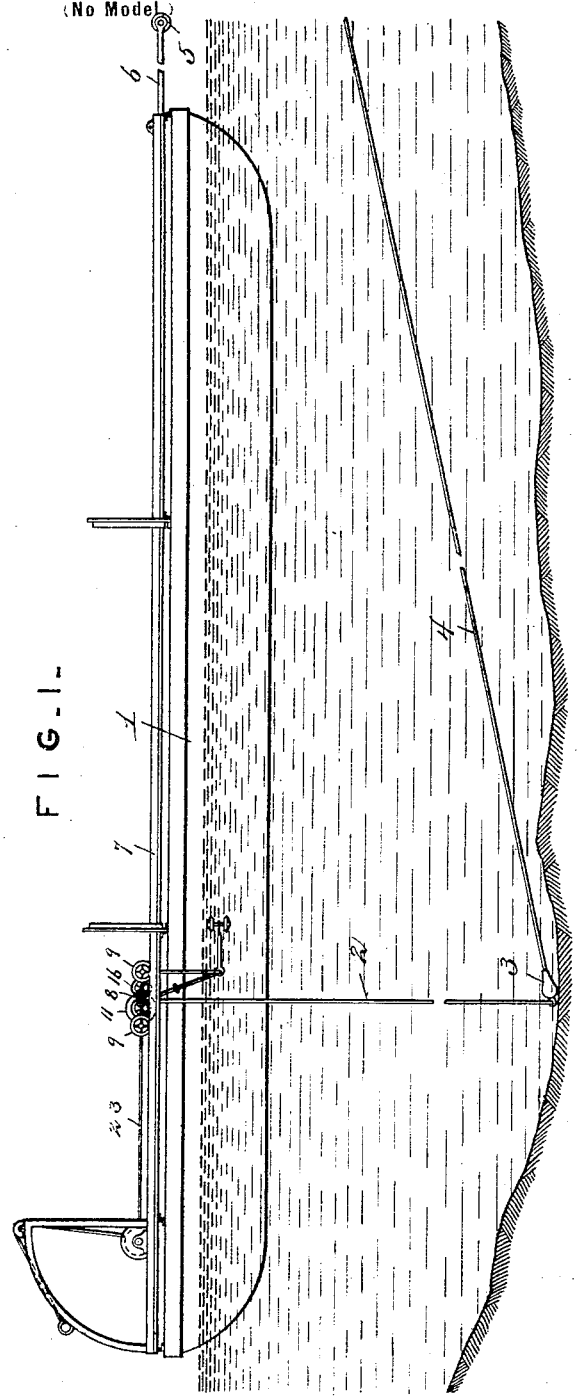

No. 630,962. Patented Aug. 15, 1899.
C. W. WOOD.
SOUNDING MACHINE.
(Application filed June 4, 1898.)
(No Model.) 3 Sheets—Sheet 1.

Witnesses
Harry L. Ames.
K. A. Kau

Inventor
Charles W. Wood.
by V. S. Stockbridge
his Attorney

THE NORRIS PETERS CO., PHOTO-LITHO., WASHINGTON, D. C.

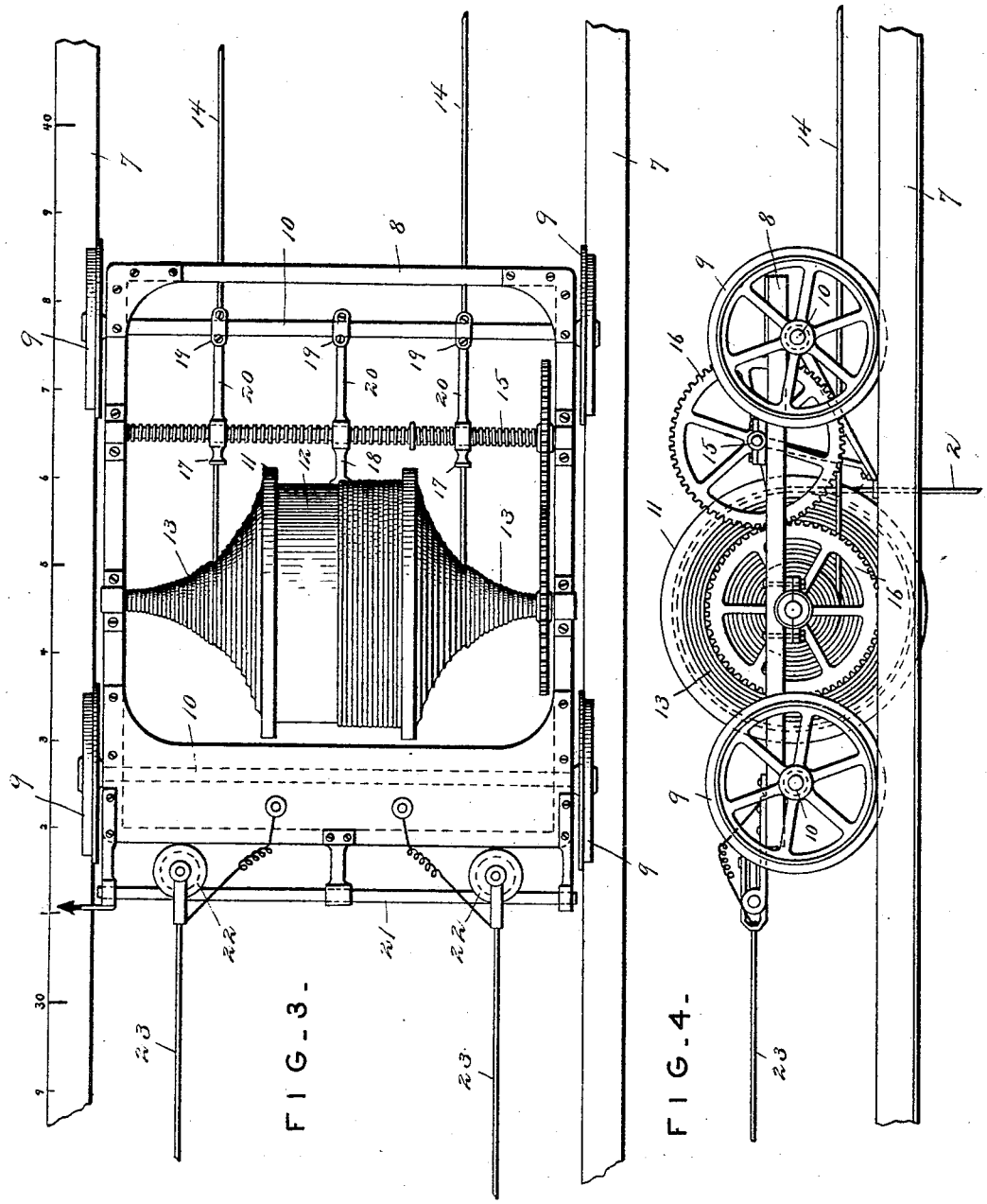

No. 630,962. Patented Aug. 15, 1899.
C. W. WOOD.
SOUNDING MACHINE.
(Application filed June 4, 1898.)
(No Model.) 3 Sheets—Sheet 3.
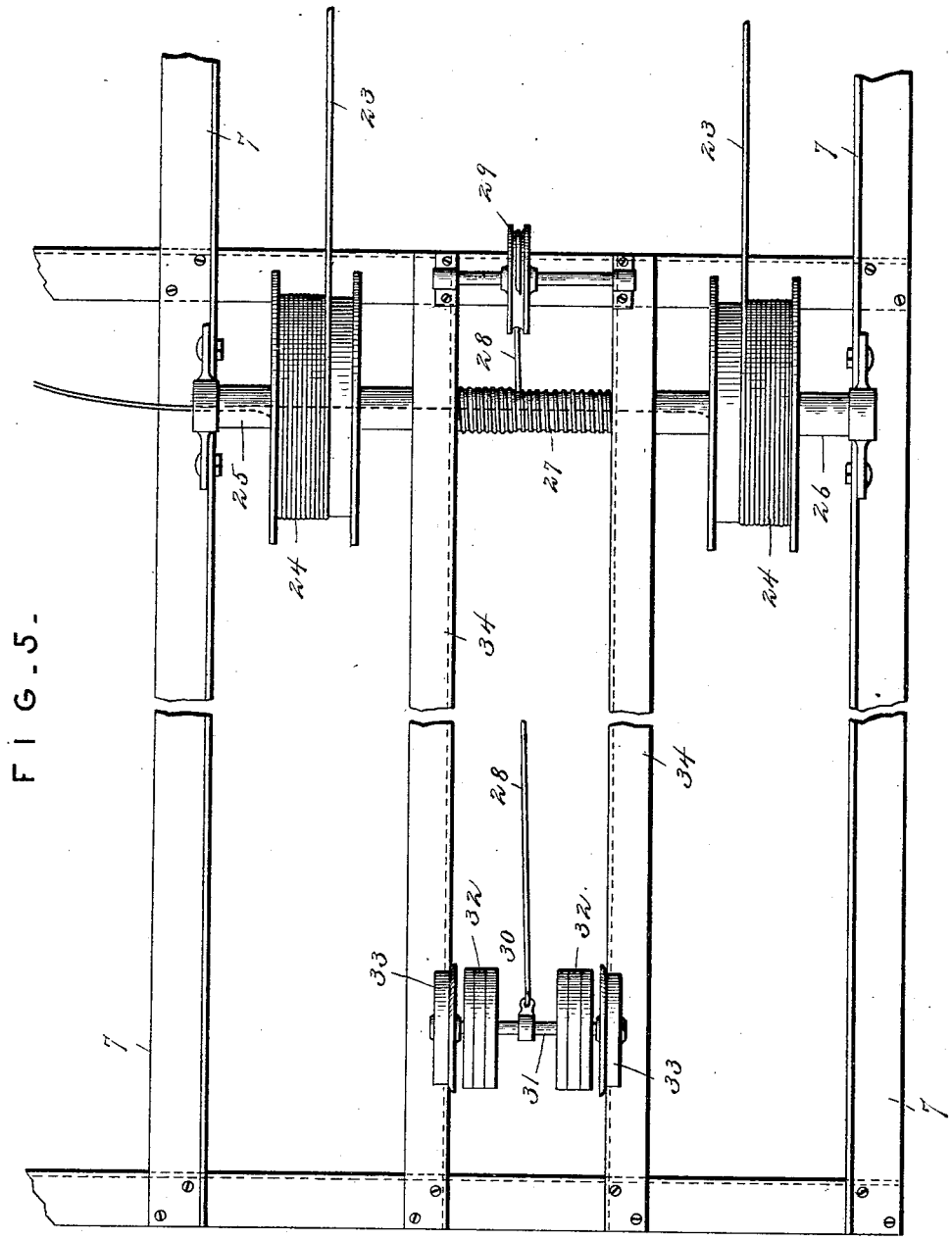
Witnesses
Harry L. Ames.
K. A. ?
Inventor
Charles W. Wood.
By O. D. Stockbridge
his Attorney.
THE NORRIS PETERS CO., PHOTO-LITHO., WASHINGTON, D. C.

UNITED STATES PATENT OFFICE.

CHARLES WIDNEY WOOD, OF NEW ORLEANS, LOUISIANA.

SOUNDING-MACHINE.

SPECIFICATION forming part of Letters Patent No. 630,962, dated August 15, 1899.

Application filed June 4, 1898. Serial No. 682,564. (No model.)

*To all whom it may concern:*

Be it known that I, CHARLES WIDNEY WOOD, a citizen of the United States, residing at New Orleans, in the parish of Orleans and State of Louisiana, have invented certain new and useful Improvements in Sounding-Machines; and I do hereby declare the following to be a full, clear, and exact description of the invention, such as will enable others skilled in the art to which it appertains to make and use the same.

This invention relates to improvements in sounding-machines, and its mechanical embodiment is the result of experiment with a machine constructed in accordance with the description contained in Letters Patent No. 608,741, granted to me August 9, 1898.

The object of the invention, broadly considered, is the production of an apparatus for use in measuring and recording with accuracy the contours of the beds of rivers or other bodies of water in a manner entirely automatic and practically accurate.

In the patent referred to I have described at some length the theory upon which my several inventions are based and pointed out that instead of taking various soundings at frequent intervals and approximating the contour of the bed by triangulations I provide a suitable weight or sounder with a vertical or sounding line designed to be maintained in a determined relation by means of drums upon which the lines are wound, agreeing in a manner to cause the proper adjustment of the lead-point or the point of suspension of the lead-line to maintain the sounding-line in a vertical position at all times with the weight in contact with the river or other bed. The apparatus described in said patent has been found to be efficacious; but I have now evolved an apparatus which is somewhat simpler and is self-contained, eliminating the necessity for connecting any part of the device with more than one vessel, the entire machine being mounted upon a comparatively small boat or vessel, which may be towed or propelled by mechanism carried by it.

In carrying out my present invention I provide a movable truck, which may be mounted upon tracks secured adjacent to the side of a vessel and upon which is mounted a duplex drum. Upon the drum are wound in opposite directions the sounding-line and a pair of auxiliary lines, which are wound upon the drum as the sounding-line is unwound therefrom when the weight descends, or vice versa when the weight ascends, the construction of the drum being such that the winding or unwinding of the sounding-line and auxiliary lines will be in the proper ratio to carry out the theory upon which the invention is based.

Figure 2:
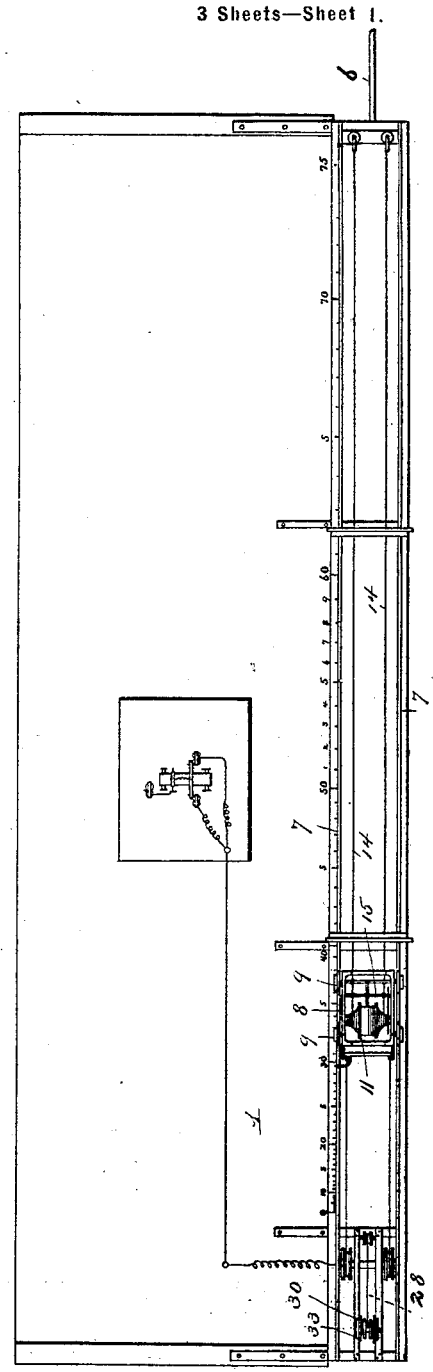

Referring to the drawings, Figure 1 is a general view showing the application of my invention to a boat. Fig. 2 is a top plan view of the same. Fig. 3 is a plan view, on an enlarged scale, of the truck and mechanism carried thereby. Fig. 4 is a side elevation of the subject-matter of Fig. 3; and Fig. 5 is a plan view of the counterbalancing-shaft, counterweight, and connected mechanism.

1 represents a boat upon which my apparatus is mounted and from which extends downwardly the sounding-line 2, carrying at its lower end a weight or sounder 3, to which is likewise attached a lead-line 4, which extends from the sounder to a point in front of the sounding-line 2 and may be permanently attached to the forward end of a boom 6, but is preferably carried over a pulley 5, located at the end of the boom 6, and thence rearwardly to near the forward end of a device designed at all times to maintain such relation between the sounding-line and the lead-line as will cause the former to assume a vertical direction at all times, notwithstanding the movement of the boat and the travel of the sounder over the varying contours of the river-bottom.

The sounding-line is designed at all times to form the sine of the arc described by the sounder 3 as it moves over the bed of the river, the center of the arc being the point of suspension of the lead-line 4, which constitutes a radius of the arc. It will be obvious, therefore, that in order to maintain the sounding-line in the relation specified it is necessary that its relation with respect to the point of suspension with the lead-line must be varied, as the arc is greater or less at various depths, and I shall now proceed to a description of a device by means of which the sounding-line is wound or unwound automatically to maintain the specified relation of the vertical and angular components of the sounding device proper.

7 indicates a pair of tracks carried by a boat adjacent to one side thereof and over which is designed to move a truck 8, mounted upon suitable wheels 9, carried by suitable shafts 10.

11 indicates what may be termed a "duplex" drum, divided into a central sounding-drum 12, of cylindrical form, and a pair of terminal oppositely-disposed conical lead-drums 13, having a peculiarly-curved longitudinal contour, as illustrated, and spirally grooved in opposite directions for the accommodation of auxiliary lines 14, which extend a sufficient distance forward and are secured at points near the transverse line of the upper extremity of the lead-line 4, the purpose of employing the two lines 14 being to properly balance the strain upon the shaft of the drum to reduce the friction to the minimum. The sounding-drum 12 is designed for the reception of the sounding-line, which is wound in a direction opposite the direction of winding of the lines 14, so that as the sounding-line is fed out the lines 14 will be wound upon the drum in a proper ratio as the sounder indicates a greater or less depth, the curved longitudinal contour of the drums 13 being properly proportioned to obtain the desired result.

15 indicates a screw-shaft mounted in the truck 8 parallel with the duplex drum and geared thereto, as by gear-wheels 16, the object of said screw-shaft being to rotate with the drum and to cause suitable line-guides 17 for the lead-lines 13 and a line-guide 18 for the sounding-line 2 to be fed in the proper direction and at the proper speed to cause the lines to be wound upon the drums with proper regularity, the line-guides being preferably steadied or braced by collars 19, movable on one of the shafts 10 and connected to the guides by connecting-rods 20.

Inasmuch as the truck 8 is designed to move upon the tracks 7 in a manner to automatically retain the proper relation between the points of suspension of the sounding-line and lead-line, provision must be made for resisting the movement of the truck to a predetermined extent and also for retracting the same. For this purpose I provide a transverse rod 21, extending across the rear end of the truck-frame and against which are designed to be held a pair of rollers 22, to which are connected a pair of cables 23, wound at their opposite ends upon a pair of counterbalance-drums 24, mounted upon a counterbalance-shaft 25, preferably hollow, as illustrated, and journaled in suitable bearings 26, the medial portion of the shaft 25 being spirally grooved at 27 for the reception of a counterbalancing-cable 28, passing around a pulley 29 and connected at its free end to a counterbalancing-weight 30, consisting of a transverse shaft 31, upon which are removably mounted a series of weights 32 and supported by a pair of wheels 33, movable upon a segmental track 34, located, preferably, at the extreme rear end of the boat. The sounder is of sufficient weight to overcome the resistance of the counterbalancing-weight, and as the sounder descends it rotates the drum and causes the truck to move forward on its track, thereby paying out the sounding-line and at the same time by the rotation of the drum taking up through the auxiliary lines 14 what would otherwise be slack due to the forward movement of the truck. On the other hand, as the sounder rises in consequence of the formation of the bed over which it is drawn the counterweight serves to draw the truck back, thereby winding up the sounding-line and paying out the lines 14 to conform to the movement of the truck or carriage. It will thus be seen that as the weight or sounder follows the varying contour of the river-bed during the movement of the boat 1 the sounding and lead lines will be wound and unwound from the drums to maintain the proper relation between the suspension-points of the lines, and the truck will be caused to move over the tracks in either direction as the tension of the counterweight predominates or is overcome.

The recording devices may be similar to those described in my patent referred to. I have shown in the drawings a recording instrument removed to a distance from the drum on which the sounding-line is wound and said apparatus connected with the carriage for said drum by electrical conductors. As, however, this will be made the subject-matter of an independent application, it is not necessary to describe the same in detail herein.

By the construction and arrangement of parts as described it will be seen that I am enabled to carry the entire sounding apparatus upon a single vessel from which both the sounding and lead lines lead to the weight or sounder. This vessel may be either provided with a motive power of its own, as stated, or it may be applied to any suitable form of vessel, as a barge, and towed by any suitable propelling vessel. Under the arrangement described the apparatus is brought into compact form and greatly simplified as compared with the construction and arrangement described in the former patent referred to.

Having thus described the invention, what is claimed as new, and sought to be secured by Letters Patent, is—

1. A sounding-machine comprising a traveling carriage, a duplex drum mounted on said carriage, a sounding-line and an auxiliary line, said lines being wound in opposite directions on said drum, a lead-line, and a weight or sounder to which the sounding and lead lines are connected.

2. A sounding-machine comprising a traveling carriage, a duplex drum mounted on said carriage and having one portion cylindrical in form and another portion conical in form, a sounding-line and an auxiliary line engaging and wound in opposite directions on said drum, one upon the cylindrical and the other upon the conical portion thereof, a lead-line, and a weight or sounder to which the sounding and lead lines are connected.

3. A sounding-machine comprising a lead-line, a traveling carriage, a duplex drum mounted on said carriage, a sounding-line and an auxiliary line wound in opposite directions on their respective portions of said drum and by the paying out or taking up of which the carriage is moved, and a weight or sounder to which the sounding and lead lines are connected, substantially as described.

4. The combination in a sounding-machine, of a duplex drum, a traveling carriage on which said drum is mounted, a sounding-line connected with a weight or sounder and wound in one direction on one part of said drum and an auxiliary line connected to another part of said drum and wound thereon in a direction reverse to that in which the sounding-line is wound, for the purpose and substantially as described.

5. A sounding-machine comprising a duplex drum, one part of which is cylindrical in form and another part of which is conical in form, said parts being connected to rotate together, a traveling carriage on which said drum is mounted, a sounding-line wound on the cylindrical part of said drum and an auxiliary line wound upon the conical part of the drum in a reverse direction to that in which the sounding-line is wound, substantially as described.

6. The combination in a sounding-machine, of a duplex drum having a cylindrical portion for the sounding-line and two oppositely-disposed conical portions for auxiliary lines, sounding and auxiliary lines wound in opposite directions upon their respective portions of said drum, a lead-line, a weight or sounder to which the sounding and lead lines are connected, a movable carriage for automatically maintaining the proper working relation of the sounding and lead lines and on which carriage the shaft of said drum is mounted, and a counterbalance-weight connected to said carriage for resisting too free movement thereof under the action of the sounding-weight, substantially as described.

7. The combination with a suitable vessel, of a suitable track or way secured to the side of said vessel, a wheeled truck adapted to move on said track, a duplex drum journaled on said truck, sounding and auxiliary lines wound in opposite directions on said drum, a lead-line, a weight or sounder connected to the sounding and lead lines, a counterbalance-weight connected to said truck, and a curved track or way over which said counterbalance-weight moves, substantially as described.

In testimony whereof I affix my signature in presence of two witnesses.

CHARLES WIDNEY WOOD.

Witnesses:
FELIX C. LORENZEN,
CHAS. H. HEINTZ.